United States Patent
Trivedi et al.

(10) Patent No.: US 10,984,393 B2
(45) Date of Patent: Apr. 20, 2021

(54) INTELLIGENT MANAGEMENT OF ELECTRONIC CALENDAR ITEMS

(71) Applicant: Microsoft Technology Licensing, LLC, Redmond, WA (US)

(72) Inventors: Anant Trivedi, Seattle, WA (US); William Holmes, Seattle, WA (US); Chandresh Kumar Jain, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 15/893,203

(22) Filed: Feb. 9, 2018

(65) Prior Publication Data
US 2019/0251518 A1    Aug. 15, 2019

(51) Int. Cl.
*G06Q 10/10* (2012.01)
*G06N 5/04* (2006.01)

(52) U.S. Cl.
CPC ........ *G06Q 10/1095* (2013.01); *G06N 5/045* (2013.01)

(58) Field of Classification Search
None
See application file for complete search history.

(56) References Cited

U.S. PATENT DOCUMENTS

| 7,155,421 | B1 * | 12/2006 | Haidar | G06N 5/003 706/46 |
| 7,233,933 | B2 * | 6/2007 | Horvitz | G06Q 10/109 706/21 |
| 7,353,232 | B1 * | 4/2008 | Kalucha | G06Q 20/382 705/64 |
| 8,600,794 | B2 | 12/2013 | Blair et al. | |

(Continued)

FOREIGN PATENT DOCUMENTS

| EP | 1505529 A1 * | 2/2005 | ........... G06Q 10/109 |
| WO | WO-9922324 A1 * | 5/1999 | ......... G06F 15/0225 |
| WO | WO-2015077398 A1 * | 5/2015 | ......... G10L 15/1822 |

OTHER PUBLICATIONS

Salazar, L. H., et al. "Using Different Models of Machine Learning to Predict Attendance at Medical Appointments." Journal of Information Systems Engineering and Management 5.4 (2020). (Year: 2020).*

(Continued)

*Primary Examiner* — Matthew S Gart
*Assistant Examiner* — Derick J Holzmacher
(74) *Attorney, Agent, or Firm* — Liang IP, PLLC

(57) ABSTRACT

Techniques of intelligent management of calendar items in computing systems are disclosed herein. In one embodiment, a calendar server can be configured to determine whether to accept a requested meeting utilizing a decision tree pre-configured at the server by a service provider. The decision tree contains one or more hierarchical decision nodes individually comparing one or more of parameters (Continued)

provided by a meeting requester to a corresponding criterion previously provided by the service provider. The calendar server can also be configured to invoke an application identified in the decision tree and provide results of the invoked application to the meeting requester in lieu of accepting the requested meeting.

20 Claims, 8 Drawing Sheets

(56) References Cited

U.S. PATENT DOCUMENTS

| | | | |
|---|---|---|---|
| 8,996,447 B2* | 3/2015 | Ziegler | G06F 8/60 |
| | | | 706/59 |
| 9,002,328 B2 | 4/2015 | Aaron | |
| 9,679,274 B1 | 6/2017 | Roth | |
| 2004/0078436 A1 | 4/2004 | Demsky et al. | |
| 2004/0088362 A1* | 5/2004 | Curbow | G06Q 10/109 |
| | | | 709/207 |
| 2004/0215535 A1* | 10/2004 | Leist | G06Q 30/04 |
| | | | 705/34 |
| 2005/0034079 A1* | 2/2005 | Gunasekar | G06Q 10/10 |
| | | | 715/753 |
| 2006/0015386 A1 | 1/2006 | Moore | |
| 2007/0088717 A1* | 4/2007 | Chen | G06F 16/35 |
| 2007/0294229 A1 | 12/2007 | Au | |
| 2009/0138389 A1* | 5/2009 | Barthel | G06Q 20/207 |
| | | | 705/31 |
| 2011/0178832 A1 | 7/2011 | Burchard et al. | |
| 2013/0103450 A1* | 4/2013 | Lehmann | G06Q 10/06314 |
| | | | 705/7.19 |
| 2013/0318028 A1* | 11/2013 | Ziegler | H04L 63/08 |
| | | | 706/59 |
| 2015/0006218 A1 | 1/2015 | Klemm et al. | |
| 2015/0067047 A1 | 3/2015 | Fu et al. | |
| 2016/0098687 A1* | 4/2016 | Lamons | G06Q 10/1095 |
| | | | 705/7.19 |
| 2016/0104094 A1* | 4/2016 | Yom-Tov | G06Q 10/109 |
| | | | 705/7.41 |
| 2016/0321599 A1* | 11/2016 | Baughman | G06Q 10/06375 |
| 2016/0328681 A1* | 11/2016 | Portnoy | G06Q 50/01 |
| 2017/0200128 A1* | 7/2017 | Kumahara | G06Q 50/01 |
| 2017/0220751 A1* | 8/2017 | Davis | G16H 20/60 |
| 2019/0019159 A1* | 1/2019 | Champaneria | G06Q 10/1053 |

OTHER PUBLICATIONS

Mitchell, Tom M., et al. "Experience with a learning personal assistant." Communications of the ACM 37.7 (1994): 80-91. (Year: 1994).*

Blum, Avrim. "Empirical support for winnow and weighted-majority algorithms: Results on a calendar scheduling domain." Machine Learning 26.1 (1997): 5-23. (Year: 1997).*

"International Search Report & Written Opinion Issued in PCT Patent Application No. PCT/US19/013894", dated Mar. 13, 2019, 13 Pages.

* cited by examiner

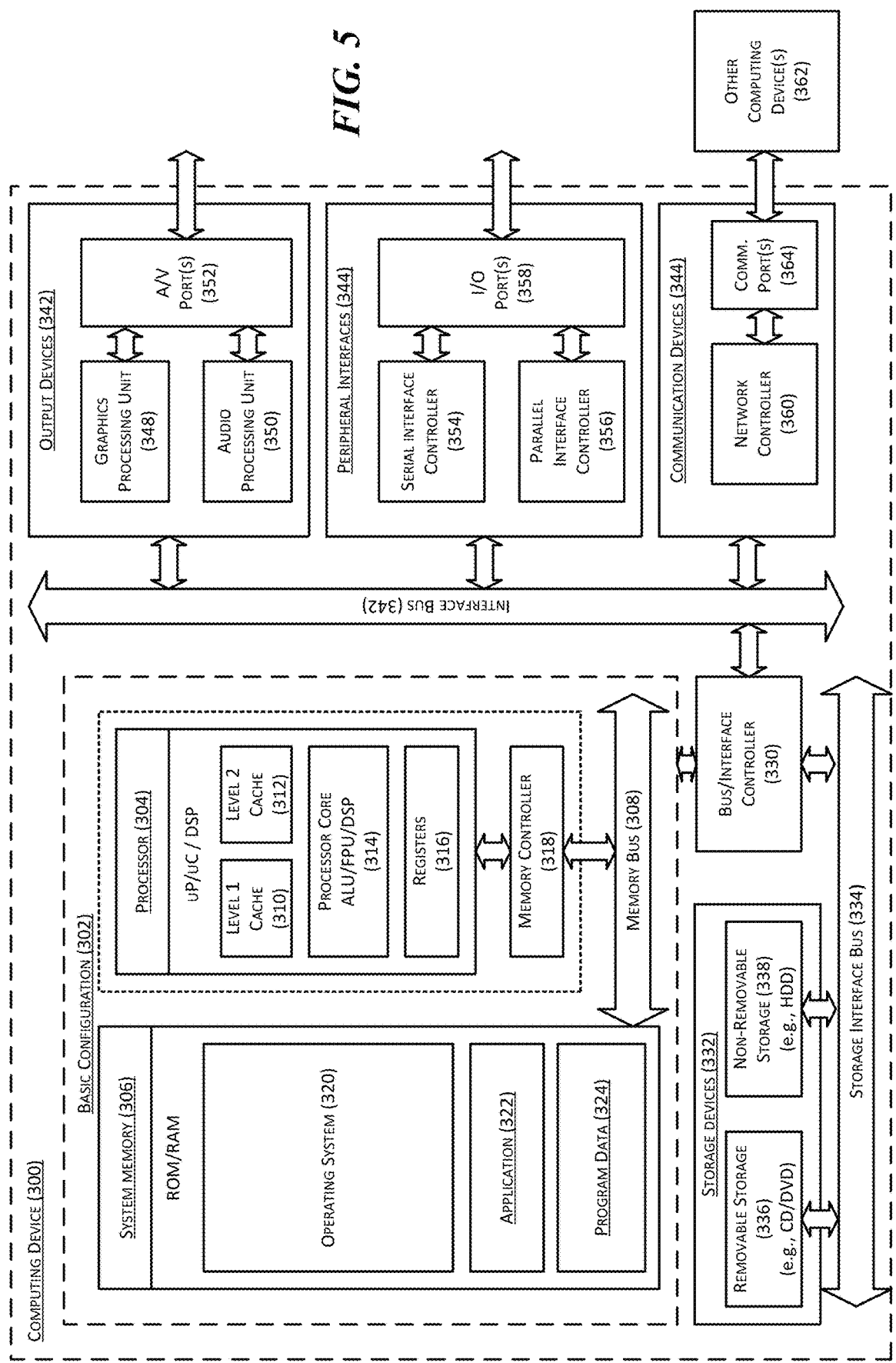

INTELLIGENT MANAGEMENT OF ELECTRONIC CALENDAR ITEMS

BACKGROUND

Electronic calendars are software applications designed to provide users with an electronic version of a physical calendar. Such software applications typically provide an appointment book, an address book, and a contact list. For example, an electronic appointment book can provide functionalities such as transmitting electronic meeting invitations, receiving and notifying newly received meeting invitations, and mechanisms for accepting, rejecting, or proposing new date/time for received meeting invitations. Once a meeting invitation is accepted, the electronic appointment book can also save the meeting as a calendar item and track a current date/time in order to provide reminders for the scheduled meeting.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In today's working environment, users may be bombarded with large numbers of electronic meeting requests every day. For example, a user, such as a certified public accountant (CPA) or other service providers can receive large numbers of meeting requests daily for filing tax returns, assisting in tax audit, or other accounting services. To attend every requested meeting may be impossible due to limited working hours in a day. Also, some of the requested meetings may be unnecessary because, for example, the meeting requester may not even have necessary information and/or documentation needed for performing the service. As such, the user (e.g., a CPA) may need to sort through all the received electronic meeting requests daily to determine which meetings to attended and which should be declined to be handled in other manners.

Processing large numbers of meeting requests in this manner can thus be time consuming and negatively impact productivity of the service provider, as well as impair functioning of a calendar server servicing the user. For instance, the calendar server may need to compute date/time conflicts for the large numbers of meeting requests, providing facilities for resolving such conflicts, as well as generating and storing a large number of calendar items corresponding to the meeting requests. As a result, the calendar server of the service provider may be overloaded to negatively impact user experience.

Several embodiments of the disclosed technology can address at least some aspects of the foregoing drawbacks. In certain embodiments, the disclosed technology is directed to a computing system configured to filter received meeting requests and replace certain meetings with specific actions based on pre-configured criteria of the service provider. In one implementation, the computing system can be configured to provide to a meeting requester a web page containing a list of services by the service provider. For example, the web page can provide a list of accounting services such as tax return filing, tax audit representation, tax consultation, etc., by a CPA. The web page can be a part of a web site of the CPA or a separate web page dedicated for requesting meetings with the CPA.

In response to receiving an input to select one of the listed services, the web page can be configured to display additional questions related to the selected service. For example, when the meeting requester selects tax return filing from the presented list, the web page can display additional questions such as whether the meeting requester has investment income, whether the meeting requester has received a W-2 form, or other suitable questions. The web page can be configured to receive user input to the additional questions from the meeting requester. The web page can then generate a meeting request containing data of all or a part of the received user input from the meeting requester. The generated meeting request can then be transmitted, via a computer network (e.g., the Internet), as an electronic data package to a calendar server for further processing.

Upon receiving the meeting request, the calendar server can be configured to analyze the data in the meeting request based on a pre-configured decision tree by the service provider. The decision tree can include multiple decision nodes interconnected with one another. The decision nodes individually containing one or more conditions and actions. For example, the decision tree can include a decision node to determine whether the meeting requester has any investment income. In response to determining that the meeting requester does have investment income, the decision node can indicate an action to accept the meeting request. Based on the decision, the calendar server can then automatically accept the meeting request and create a calendar item for the accepted meeting. The calendar item can then be saved in a calendar folder of the service provider on the calendar server.

On the other hand, if the meeting requester does not have any investment income, the decision tree can include another action to proceed to a subordinate decision node to determine whether the meeting requester has received an income statement form, (i.e., a W-2 form). In response to determining, based on the received input from the meeting requester, that a W-2 form has not been received, the decision node can include a further action to automatically generate a message (e.g., an email) to the meeting requester for requesting a W-2 form and decline the requested meeting. In response to determining that the meeting requester has received a W-2 form, the decision node can include another action to automatically generate a tax return (e.g., a 1040EZ form) based on values (e.g., wage received, tax withheld, etc.) in the W-2 form. The calendar server can then transmit a copy of the 1040EZ form to the meeting requester and, optionally, the service provider, as a response to the meeting request. As such, unnecessary meetings for the service provider may be reduced or even avoided.

Several embodiments of the computing system can thus improve functioning of the calendar server by reducing or even eliminating unnecessary meetings for the service provider. By filtering meeting requests through the decision tree, the calendar server can replace certain meeting requests with specific actions such as automatically generating tax forms, requesting additional information, etc., and decline these meeting requests. As such, the calendar server can reduce a number of meeting scheduled for the service provider. The reduced number of scheduled meetings can thus reduce a workload of the calendar server for computing data/time conflicts and/or other calendar operations. Hence, operations of the calendar server can be improved.

BRIEF DESCRIPTION OF THE DRAWINGS

FIG. 5 is a computing device suitable for certain components of the distributed computing system in FIG. 1.

DETAILED DESCRIPTION

Figure 1A:
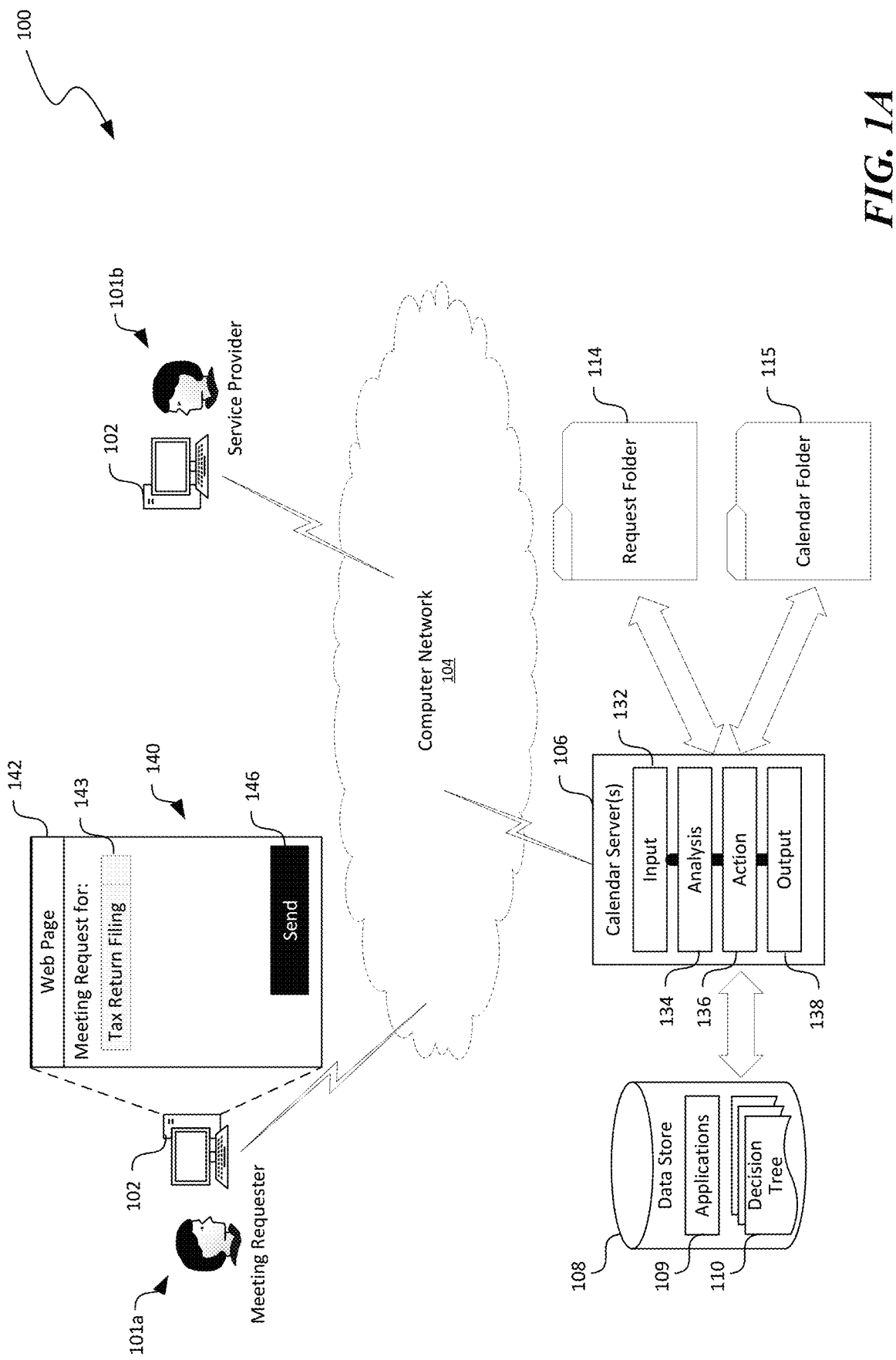
FIGS. 1A-1D are schematic diagrams illustrating a computing system implementing intelligent management of calendar items during certain operation stages in accordance with embodiments of the disclosed technology.
Figure 1B:
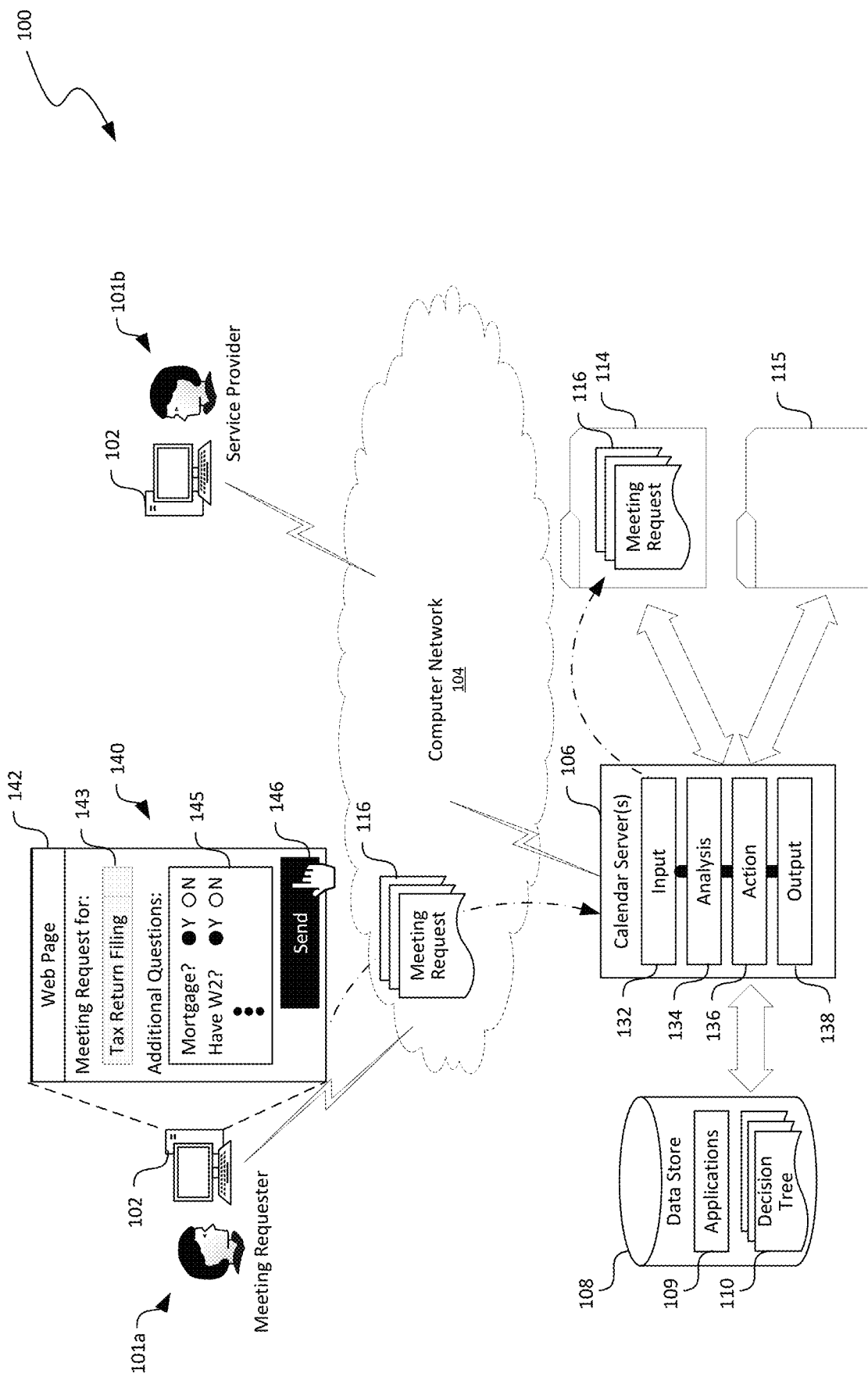

Certain embodiments of systems, devices, components, modules, routines, data structures, and processes for intelligent management of calendar items in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-5.

As used herein, the term "calendar server" generally refers to computer or server dedicated to running such software applications that are configured to provide an electronic version of a physical calendar to one or more users. Such applications typically can provide an appointment book, an address book, and a contact list. For example, an appointment book can provide functionalities such as generating and transmitting electronic meeting invitations, receiving and notifying newly received meeting invitations, and mechanisms for accept, reject, or proposed new date/time for any received meeting invitations. Examples of such applications include Microsoft Exchange®, qmail, Exim, and sendmail. A calendar server can also be configured to provide a calendar item folder for a user. The calendar item folder can contain calendar items such as meeting appointments, reminders, etc. The calendar item folder can also be synchronized with a corresponding folder on a client device accessible by the user via a computer network such as the Internet.

Also used herein, a "meeting request" generally refers to a digital data package containing data representing a request for a meeting with a service provider or other suitable types of user. A meeting request can contain structured or non-structured data representing various data fields. For instance, example data fields can include identification of a meeting requester, a requested service, a meeting date/time, etc. In accordance with embodiments of the disclosed technology, the meeting request can also include data fields containing values, parameters, and/or answers to one or more questions concerning the requested service. The questions can be pre-configured by the service provider or automatically generated by a calendar server based on a knowledge database, machine learning, or other suitable sources.

Also used herein, a "decision tree" generally refers to a decision support tool that uses a tree-like graph or model of decisions and corresponding consequences. An example decision tree can contain a plurality of decision nodes arranged in a hierarchy. Each of the decision nodes can contain one or more conditional control statements. A conditional control statement can include one or more conditions or criteria (e.g., greater than, equal to, or smaller than a threshold) and one or more corresponding consequences (e.g., to accept a meeting, to decline a meeting, to reschedule a meeting, etc.). One example decision tree is described in more detail below with reference to FIG. 2.

In addition, an "action" as used herein generally refers to one or more operations invokable via an electronic instruction. For example, an action may include triggering a function call through an application programming interface (API) related to a web-based application, operating system, database, or computer hardware or software library. In another example, the action can also include receive results of the triggered function call and provide the results to a meeting requester via a computer network in lieu of accepting the requested meeting and transmitting a meeting confirmation. In other examples, the action can also include transmitting a message (e.g., an email) to the meeting requester for additional information, marking the meeting request as a fake request, or performing other suitable operations.

In today's working environment, users may be bombarded with large numbers of meeting requests every day. For example, a service provider, such as a CPA can receive large numbers of meeting requests daily for requesting various accounting services. To attend every requested meeting may be impossible due to limited working hours in a day. Also, some of the requested meetings may be unnecessary because, for example, the meeting requester may not even have necessary information for the requested service. In other situations, the requested meeting may be efficiently provided via automated computer processing. As such, the CPA may need to sort through all the meeting requests daily to determine which meetings to attended and which should be declined. Processing large numbers of meeting requests in this manner can be time consuming and laborious.

Several embodiments of the disclosed technology can address at least some aspects of the foregoing drawbacks. In certain embodiments, the disclosed technology is directed to automatically filtering received meeting requests at a calendar server and replace unneeded meetings with specific actions based on pre-configured criteria of the service provider. For example, the calendar server can utilize a decision tree to determine whether an action can be used to replace a requested meeting. In response to determining that an action can replace the requested meeting, the calendar server can invoke the action identified in the decision tree and decline the requested meeting concerning the requested service. As such, the calendar server can automatically reduce or even eliminate unnecessary meetings for the service provider. Thus, efficiencies and functioning of the calendar server may be improved, as described in more detail below with reference to FIGS. 1A-5.

FIGS. 1A-1D are schematic diagrams illustrating a computing system 100 implementing intelligent management of calendar items during certain operation stages in accordance with embodiments of the disclosed technology. In FIGS. 1A and 1n other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1A, the computing system 100 can include a computer network 104 interconnecting client devices 102 with one or more calendar servers 106 (referred to as "calendar server 106" here in for simplicity). The client devices 102 can individually correspond to a meeting requester 101a and a service provider 101b. The computer network 104 can include an intranet, a wide area network, the Internet, or other suitable types of network. The calendar server 106 is also interconnected with a request folder 114 and a calendar folder 115 corresponding to a service provider 101b and a data store 108 containing one or more invokable applications 109 and decision tree 110. The applications 109 can include those suitable for performing one or more actions, as described below, or for performing other suitable operations. The decision tree 110 can include multiple decision nodes related to a requested service and provided by the service provider 101b. In other embodiments, the data store 108 can also contain data of search indices, blank forms, and/or other suitable types of documents. In further embodiments, the applications 109 and/or decision tree 110 may not be present in the data store 108. Instead, functionalities of the applications 109 and/or content of the decision tree 110 may be provided from external sources, such as additional servers or network storage spaces (not shown).

Even though particular components of the computing system 100 are shown in FIG. 1A, in other embodiments, the computing system 100 can also include additional and/or different components or arrangements. For example, in certain embodiments, the computing system 100 can also include additional network storage devices, additional servers, and/or other suitable components (not shown). In other embodiments, the data store 108 may be integrated into the calendar server 106.

The client devices 102 can each include a computing device that facilitates corresponding meeting requester 101a or service provider 101b to access computing services provided by the calendar server 106 via the computer network 104. For example, in the illustrated embodiment, the client devices 102 individually include a desktop computer. In other embodiments, the client devices 102 can also include laptop computers, tablet computers, smartphones, or other suitable computing devices. Even though one meeting requester 101a and one service provider 101b are shown in FIG. 1A for illustration purposes, in other embodiments, the computing system 100 can facilitate any suitable number of meeting requesters 101a and/or service providers 101b to access suitable types of computing services provided by the calendar server 106.

In accordance with aspects of the disclosed technology, the calendar server 106 can be configured to filter received meeting requests 116 (shown in FIG. 1B) and replace unneeded meetings with specific actions based on preconfigured criteria of the service provider 101b. As shown in FIG. 1A, the calendar server 106 can include one or more processors 304 (shown in FIG. 5) and a memory 306 (shown in FIG. 5) containing instructions executable by the one or more processors to cause the calendar server 106 to provide an input component 132, an analysis component 134, an action component 136, and an output component 138 operatively coupled to one another. Though particular components of the calendar server 106 are shown in FIG. 1A, in other embodiments, the calendar server 106 can also include network interface components, database management components, or other suitable types of components.

The input component 132 can be configured to receive a meeting request 116 from the meeting requester 101a via the client device 102 and the computer network 104. As shown in FIG. 1A, in certain embodiments, the meeting requester 101a can generate and transmit a meeting request 116 via a web page 142 displayed on the client device 102 via a web browser 140. The web page 142 can be a part of a web site (not shown) of the service provider 101b or a separate web page automatically generated by a service web site (e.g., Microsoft Booking®). In other embodiments, the meeting requester 101a can generate and transmit a meeting request 116 via an application on a mobile device, or in other suitable manners.

In the example illustrated in FIG. 1A, the web page 142 can include a dropdown menu 143 through which the meeting requester 101a can select a requested service and a send button 146 for sending a meeting request 116. For instance, the meeting requester 101a can select "Tax Return Filing" from the dropdown menu 143. In response to the selection, the web page 142 can, for example, by executing suitable Java scripts, provide additional questions 145 concerning the requested service to the meeting requester 101a. For instance, as shown in FIG. 1A, the example additional questions 145 include questions regarding whether the meeting requester 101a has a mortgage and W-2 forms with corresponding radio buttons for selection.

Once answers to the additional questions 145 are received, for instance, the radial buttons selected by the meeting requester 101a, upon actuation of the send button 146, the web page 142 can, for instance, execute additional Java Scripts to generate the meeting request 116. In certain embodiments, the meeting request 116 can include structured or unstructured data fields containing values, parameters, answers, or other suitable data representing input received from the meeting requester 101a. The meeting request 116 can also include other data field containing data representing, for instance, identification of the meeting requester 101a, the requested service, a requested date/time, or other suitable information. The web page 142 can the cause the meeting request 116 be transmitted to the calendar server 106 via the computer network 104.

The input component 132 can then be configured to receive the meeting request 116, store a copy of the received meeting request 116 in the request folder 114, and optionally pre-process the received meeting request 116. For instance, in certain embodiments, the input component 132 can be configured to authenticate the meeting request 116 based on digital certificate attached to the meeting request 116. In other embodiments, the input component 132 can be configured to determine whether the meeting request 116 is actually from the meeting requester 101a based on, for example, a public key of the meeting requester 101a. In further embodiments, the input component 132 can also be configured to verify that the meeting request 116 is in an acceptable data format, contains necessary data values, and/or perform other suitable operations on the meeting request 116.

Upon completion of optional pre-processing, the input component 132 can forward the meeting request 116 to the analysis component 134 for further processing. In certain embodiments, the analysis component 134 can be configured to process the values, parameters, or other answers included in the meeting request 116 based on a decision tree 110 pre-configured by the service provider 101b. The decision tree 110 can include a plurality of decision nodes individually containing one or more conditional control statements. The analysis component 134 can be configured to traverse the decision tree 110 by comparing the values, parameters, or other answers with conditions or criteria at each of the decision node. One example decision tree 110 is described in more detail below with reference to FIG. 2.

Once the decision tree 110 has been traversed, the analysis component 134 can provide a processing result to the action component 136 for further processing. In certain embodiments, the processing result can include selectively declining the requested meeting and automatically providing a document related to the requested service to the meeting requester 101a via the computer network 104 in lieu of accepting the requested meeting. For instance, in the illustrated example, if the meeting requester 101a does not have a mortgage and has received a W-2 form, the process result may include an indication that a 1040EZ form is to be prepared based on some of the values included in the meeting request 116.

In response to the indication, the action component 136 can cause execution of a suitable application 109 on the calendar server 106 or another suitable computing device (e.g., another server in the computing system 100, not shown) to generate the 1040EZ form based on, for instance, a template form 110 from the data store 108. In other examples, the action component 136 can also trigger a function call through an API related to a web-based application to generate the 1040EZ form based on the values from the meeting requester 101a.

Figure 1C:
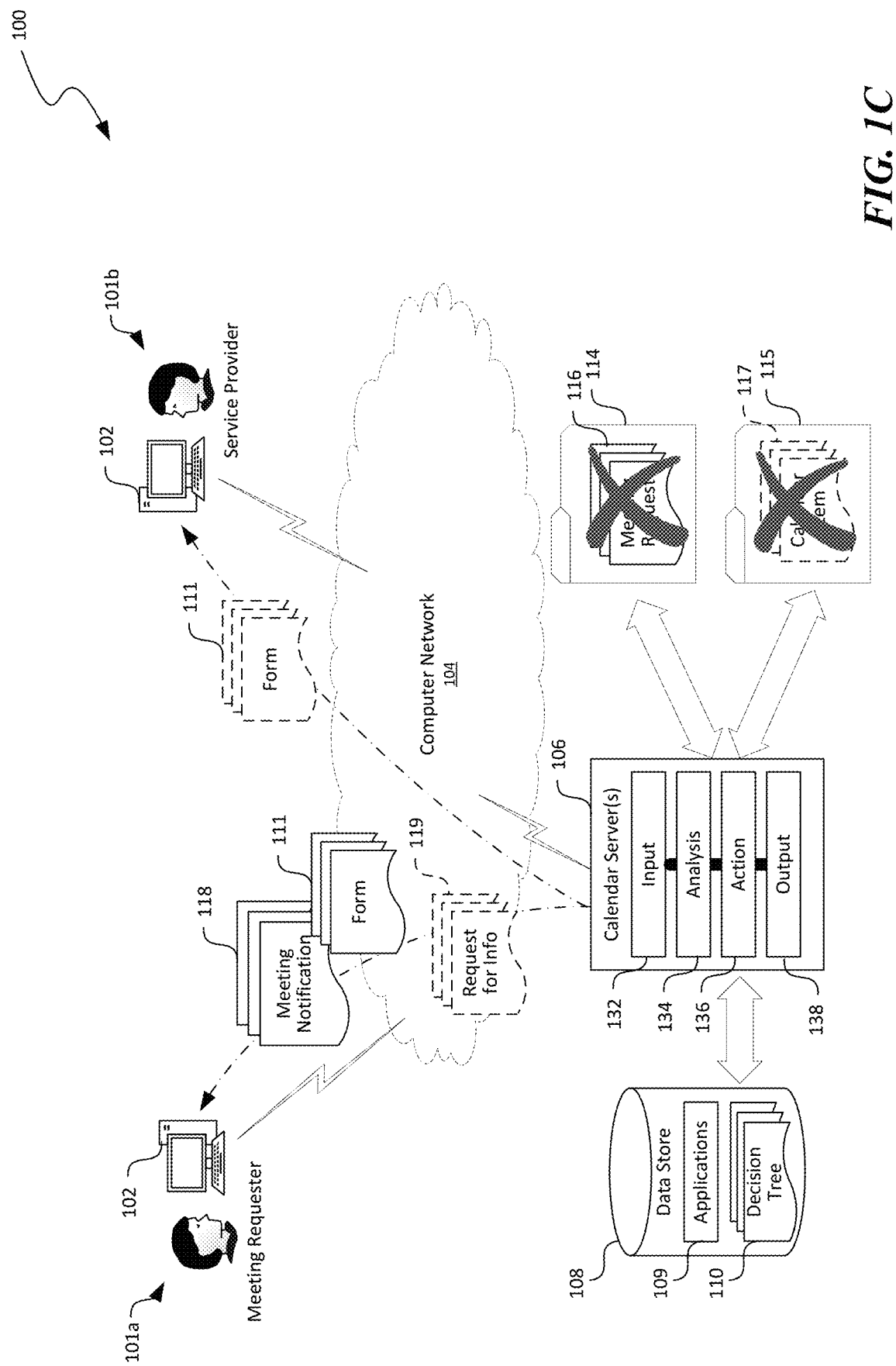

Subsequently, the output component 138 can generate and transmit, via the computer network 104, to the meeting requester 101a the generated 1040EZ form 111 and a meeting notification 118 to decline the requested meeting, as shown in FIG. 1C. Thus, a meeting appointment as a calendar item 117 is not created and stored in the calendar folder 115. Optionally, the output component 138 can also be configured to transmit a copy of the generated 1040EZ form 111 to the service provider 101b for record keeping or other suitable purposes. Then, the meeting request 116 can be removed from the request folder 114, marked as responded, or otherwise discarded.

In other embodiments, the processing results can include selectively declining the requested meeting without automatically providing the form 111 to the meeting requester 101a. Instead, the output component 138 can generate and transmit a request for information 119 along with the meeting notification 118 to decline the requested meeting. The request for information 119 can indicate to the meeting requester 101a that additional information, such as W-2 forms, is needed before a meeting can be scheduled. In certain implementations, the output component 138 can also be configured to provide, for instance, a link to the web page 142 (FIG. 1B) for rescheduling the meeting. In other implementations, the output component 138 can also be configured to provide one or more template forms 110 to the meeting requester 101a.

Figure 1D:
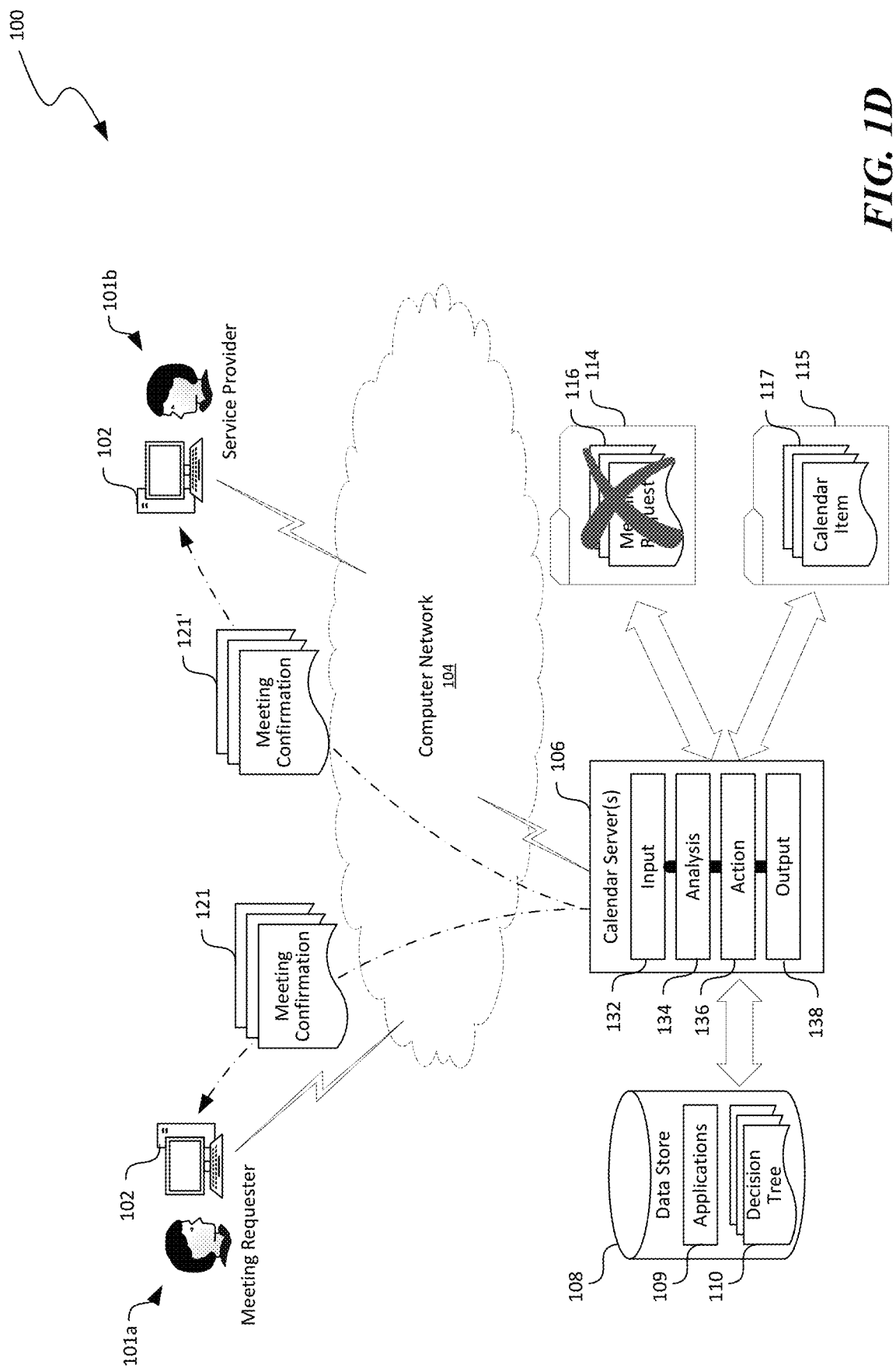

In further embodiments, the processing results can include accepting the meeting request 116 because the logic included in the decision tree 110 indicates that having a meeting to discuss certain issues may be prudent based on the answers received in the meeting request 116. For instance, when the meeting requester 101a indicates that the meeting requester 101a is currently carrying a mortgage and has received a W-2 form, the decision tree 110 may indicate that a meeting is suitable to explore suitable tax filing strategies. In response, as shown in FIG. 1D, the output component 138 can be configured to generate meeting confirmations 121 and 121' and transmit the generated meeting confirmations 121 and 121' to the meeting requester 101a and the service provider 101b, respectively. The output component 138 can also be configured to create and store a meeting appointment as a calendar item 117 in the calendar folder 115. In certain embodiments, the calendar item 117 can then be synchronized to a corresponding calendar folder (not shown) on the client device 102 of the service provider 101b. In other embodiments, the calendar item 117 may be provided to the service provider 101b via a web accessible interface.

Several embodiments of the computing system 100 can thus improve functioning of the calendar server 106 by reducing or even eliminating unnecessary meetings for the service provider 101b. By filtering received meeting requests 116 through the decision tree 110, the calendar server 106 can replace certain meeting requests 116 with specific actions such as automatically generating tax forms, requesting additional information, etc., and decline these meeting requests 116. As such, the calendar server 106 can reduce a number of meeting scheduled for the service provider 101b. The reduced number of scheduled meetings can thus reduce a workload of the calendar server 106 for computing data/time conflicts and/or other calendar operations. Hence, operations of the calendar server 106 as well as processing meeting requests 116 by the service provider 101b can be improved.

Even though various embodiments of the disclosed technology are described above as being applied in the context of requesting/receiving accounting services, embodiments of the computing system can also be applied in other suitable context for filtering and replacing meeting requests with suitable actions. For example, similar computing system can be configured to filter and replace requested in-person or other types of meetings with an information technology personnel for technical support. In such computing systems, a requested meeting can be replaced by, for instance, automatically transmitting a message containing troubleshooting instructions, software updates, or other suitable information. In other examples, computing systems with additional and/or different components can also be provided for filter and replace requested appointments for legal, medical, or other suitable types of services.

Figure 2:
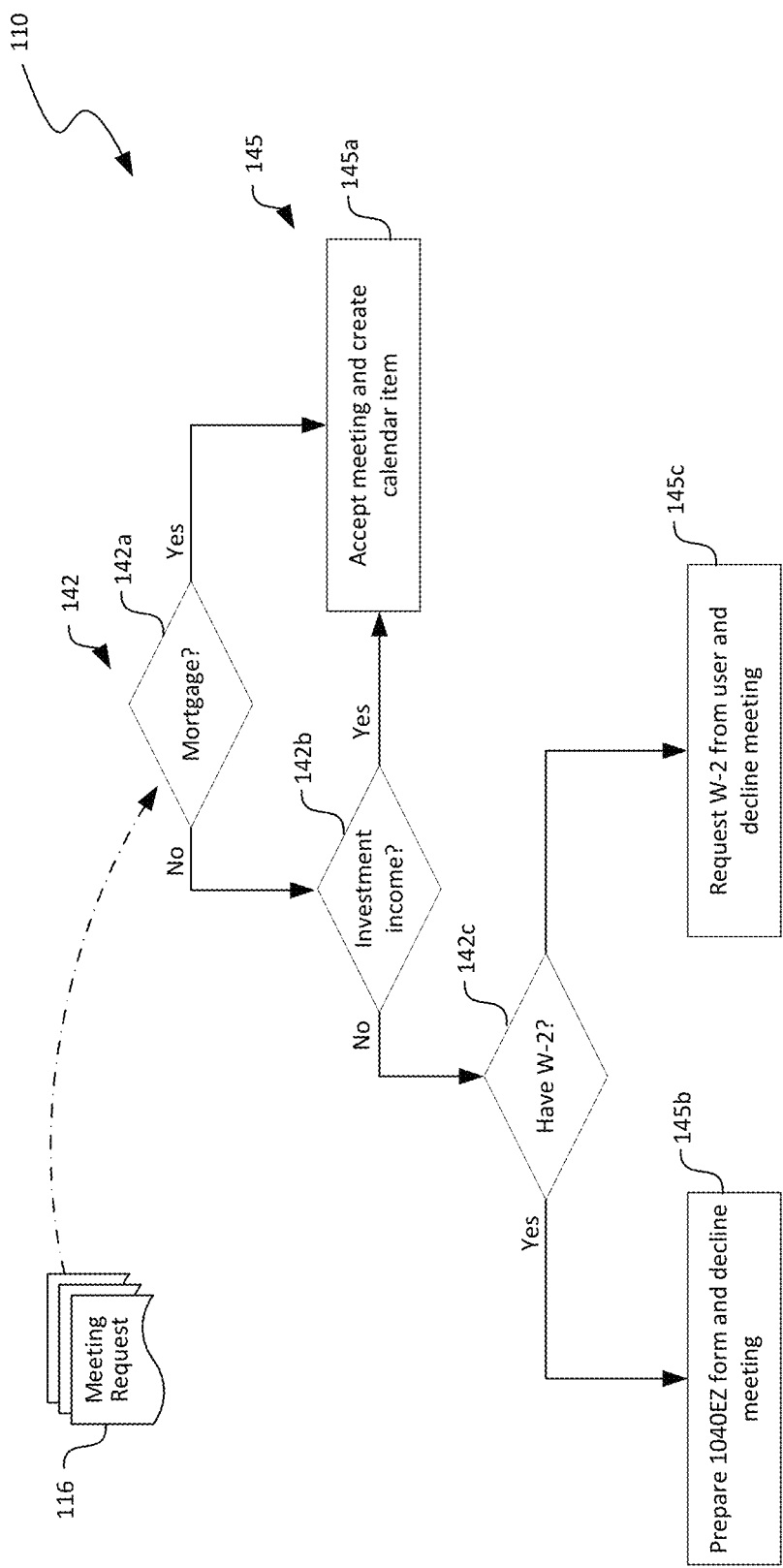
FIG. 2 is an example decision tree in accordance with embodiments of the disclosed technology.

FIG. 2 is an example decision tree 110 in accordance with embodiments of the disclosed technology. Though particular conditions and actions are shown in FIG. 2 for illustration, in other embodiments, the decision tree 110 can include other suitable numbers, arrangements, conditions, or other suitable characteristics of the decision nodes 142. As shown in FIG. 2, the decision tree 110 can include a plurality of decision nodes 142 arranged in a hierarchical manner. Each decision node 142 can include one or more conditions and one or more actions. For example, the decision tree 110 can include a first decision node 142a to determine whether the meeting requester 101a (FIG. 1A) is currently carrying a mortgage. If the meeting requester 101a is currently carrying a mortgage, as indicated in a value or parameter included in the meeting request 116, a resulting first action 145a includes accepting the meeting request and creating a calendar item for the meeting.

Otherwise, the decision tree 110 can traverse to a second decision node 142b to determine whether the meeting requester 101a has investment income. If the meeting requester 101a has investment income, the decision tree 110 proceeds to the first action 145a for accepting the meeting request and creating a calendar item for the meeting. Otherwise, the decision tree 110 traverses to a third decision node 142c to determine whether the meeting requester 101a has a W-2 form. In response to determining that the meeting requester 101a has a W-2 form, the decision tree 110 can proceed to a second action 145b including preparing a 1040EZ form based on values (e.g., wage received, tax withheld, etc.) and declining the requested meeting. Otherwise, the decision tree 110 can proceed to a third action 145c including requesting W-2 form from the meeting requester 101a and declining the requested meeting.

Figure 3:
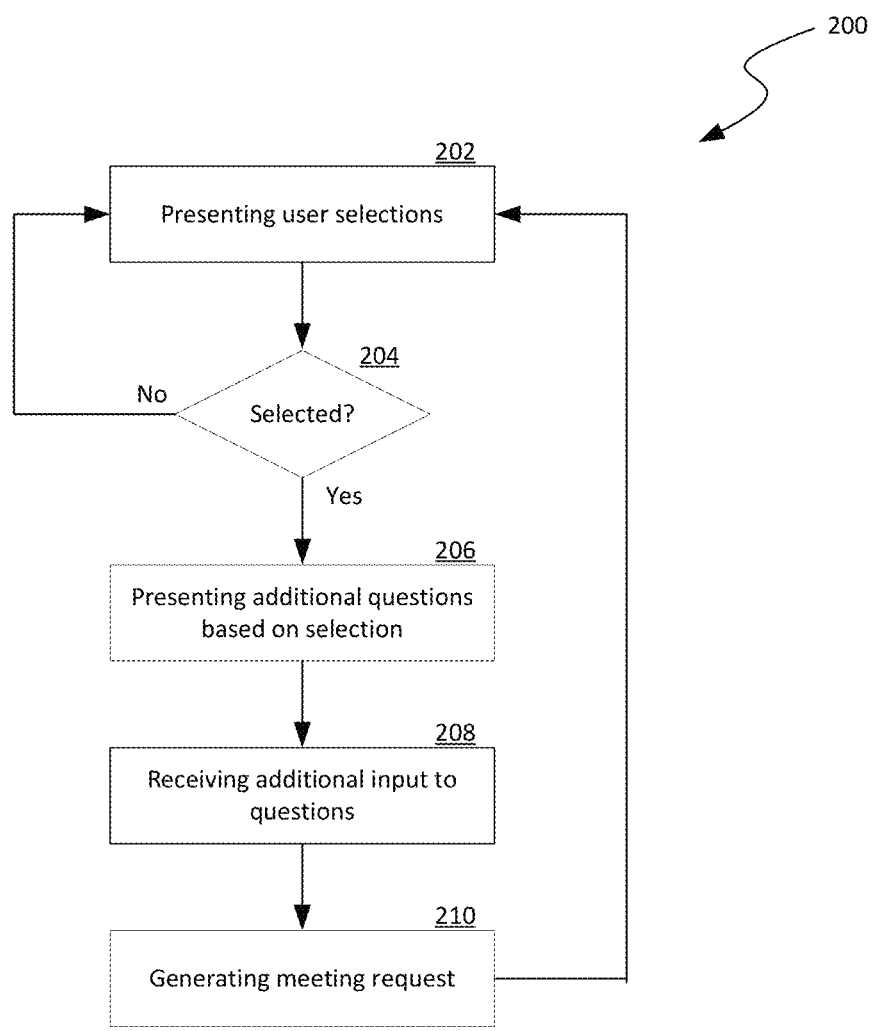
FIGS. 3-4B are flowcharts illustrating processes of intelligent management of calendar items in accordance with embodiments of the disclosed technology.
Figure 4A:
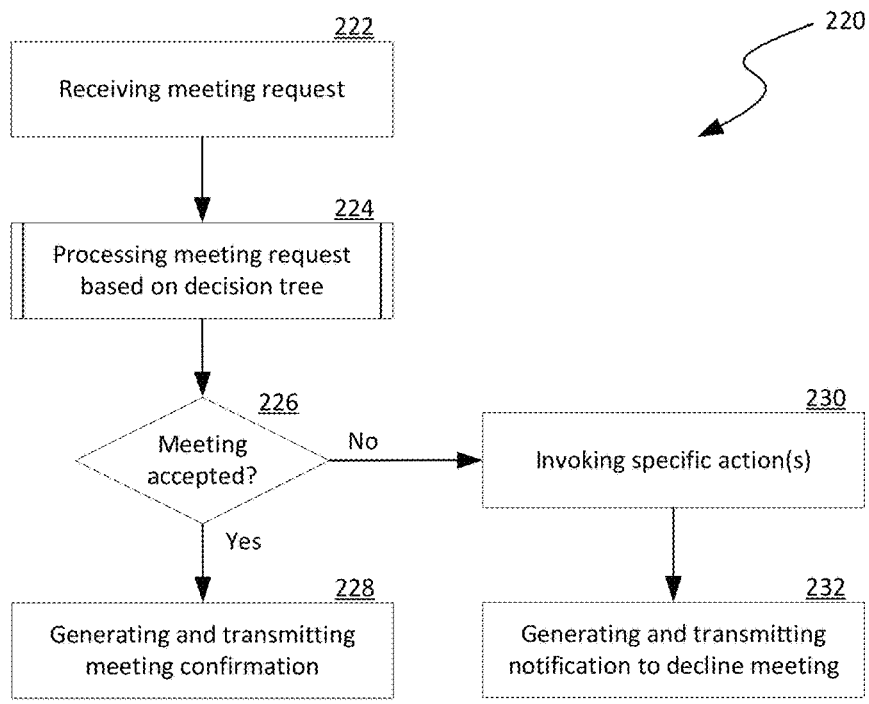
Figure 4B:
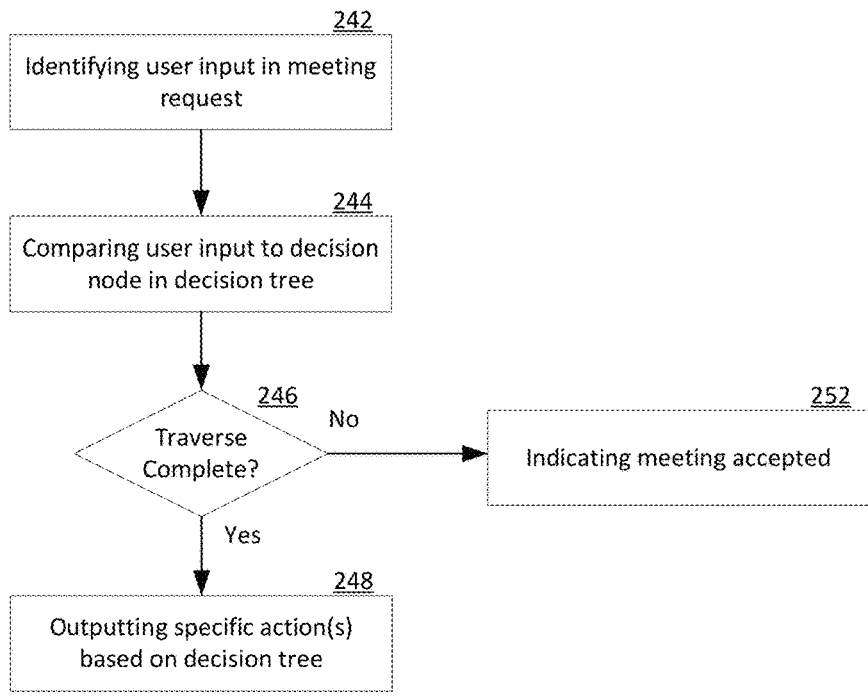

FIGS. 3-4B are flowcharts illustrating processes of intelligent management of calendar items in accordance with embodiments of the disclosed technology. Though the process is described in the context of the computing system 100 of FIGS. 1A-1D, embodiments of the process can also be implemented in other computing systems with additional and/or different components.

As shown in FIG. 3, a process 200 can include presenting user selections at stage 202. In certain examples, the user selections can include a list of services a meeting requester 101a (FIG. 1A) can request from a service provider 101b (FIG. 1A). The process 200 can then include a decision stage 204 to determine whether a service has been selected. In response to detecting a selected service, the process 200 can include presenting additional questions concerning the selected service at stage 206. The additional questions can be pre-configured by the service provider and include inquiries regarding various aspects of the selected service. The process 200 can then include receiving user input to the additional questions at stage 208 and generating a meeting request based on the received user input at stage 210. The process 200 can then revert to presenting user selections at stage 202 for allowing the meeting requester 101a to select additional services.

As shown in FIG. 4A, a process 220 can include receiving a meeting request at stage 222. The meeting request can include one or more values, parameters, or answers to questions concerning a requested service. The process 220 can then include processing the meeting request based on a decision tree 110 (FIG. 2). An example of processing the meeting request can include traversing the decision tree based on the values, parameters, or answers included in the meeting request, as described above with reference to FIGS. 1A-1D. Example operations of traversing the decision tree are described below in more detail with reference to FIG. 4B.

The process 220 can then include a decision stage 226 to determine whether the requested meeting is to be accepted. In one embodiment, the meeting is to be declined when one or more specific actions may be performed in lieu of having the meeting. As such, the process 220 can include invoking the one or more specific actions at stage 230. The process 220 can further include generating and transmitting a notification to decline the requested meeting. In other embodiments, the meeting is to be accepted when the decision tree indicates that the meeting should be accepted or the decision tree cannot make a decision based on received information in the meeting request. In such embodiments, the process 220 can proceed to generating a calendar item for the accepted meeting and transmitting meeting confirmations at stage 228.

As shown in FIG. 4B, operations of traversing a decision tree can include identifying various values, parameters, answers, or other user input included in the meeting request at stage 242. The operations can then include comparing the various identified values, parameters, answers, or other user input to condition(s) in successive decision nodes of the decision tree at stage 244. One example of traversing the successive decision nodes are described above with reference to FIG. 2. The operations can then include a decision stage 246 to determine whether traversing of the decision tree is completed based on, for example, whether additional decision nodes are present. In response to determining that traversing is complete, the operations can include outputting one or more specific actions indicated by the decision tree at stage 248. Otherwise, the operations can include indicating meeting accepted at stage 252.

FIG. 5 is a computing device 300 suitable for certain components of the distributed computing system 100 in FIG. 1. For example, the computing device 300 can be suitable for the calendar server 106 and/or the client devices 102 of FIG. 1A. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for intelligent management of calendar items in a computing system having a server interconnected to client devices by a computer network, the method comprising:
   receiving, via the computer network, an electronic message representing a meeting request for requesting a meeting with a service provider, the meeting request containing data representing a requested service from the service provider and a plurality of values provided concerning the requested service; and
   upon receiving electronic message representing the meeting request, at the server,
      determining whether an action can replace the requested meeting utilizing a decision tree pre-configured by the service provider, the decision tree containing one or more hierarchical decision nodes individually comparing one or more of the plurality of values concerning the requested service to a corresponding criterion automatically provisioned by another server based on a knowledge database or machine learning; and
      in response to determining, according to the decision tree, that an action can replace the requested meeting,
         invoking, with the server, the action identified in one of the hierarchical decision nodes of the decision tree in lieu of scheduling a meeting in response to the received electronic message representing the meeting request; and
         transmitting, via the computing network, to the meeting requester a notification to decline the requested meeting concerning the requested service.

2. The method of claim 1, further comprising:
   in response to determining, according to the decision tree, that an action cannot replace the requested meeting,
      generating and transmitting, via the computer network, to the meeting requester a meeting confirmation to accept the requested meeting; and
      automatically generate a meeting appointment, on the server, as a calendar item of the service provider.

3. The method of claim 1, further comprising:
   in response to determining, based on the decision tree, that a decision cannot be made based on the plurality of values,
      generating and transmitting, via the computer network, to the meeting requester a meeting confirmation to accept the requested meeting; and
      automatically save a meeting appointment, on the server, as a calendar item in a calendar folder of the service provider.

4. The method of claim 1 wherein invoking the action includes:
triggering a function call through an application programming interface related to a web-based application, operating system, database, or computer hardware or software library.

5. The method of claim 1 wherein invoking the action includes:
triggering a function call through an application programming interface related to a web-based application, operating system, database, or computer hardware or software library; and
providing results of the triggered function call to the meeting requester via the computer network in lieu of the meeting confirmation.

6. The method of claim 1 wherein invoking the action includes:
triggering a function call through an application programming interface related to a web-based application via the computer network, the functional call passing at least some of the values provided by the meeting requester; and
providing results of the triggered function call to the meeting requester via the computer network in lieu of the meeting confirmation, the results including a document derived based on the at least some of the values provided by the meeting requester.

7. The method of claim 1 wherein:
the service provider has a meeting request folder and a calendar item folder on the server; and
receiving the meeting request includes receiving and storing, in the meeting request folder, a copy of the received meeting request.

8. The method of claim 1 wherein:
the service provider has a meeting request folder and a calendar item folder on the server;
receiving the meeting request includes receiving and storing, in the meeting request folder, a copy of the received meeting request; and
the method further includes in response to determining, according to the decision tree, that the action can replace the requested meeting, not creating a meeting appointment as a calendar item in the calendar item folder.

9. The method of claim 1 wherein:
the service provider has a meeting request folder and a calendar item folder on the server;
receiving the meeting request includes receiving and storing, in the meeting request folder, a copy of the received meeting request; and
the method further includes in response to determining, according to the decision tree, that an action cannot replace the requested meeting, storing the automatically generated meeting appointment as a calendar item in the calendar item folder on the server.

10. A computing device configured to be interconnected to one or more client devices by a computer network, the computing system comprising:
a processor; and
a memory operatively coupled to the processor, the memory containing instructions executable by the processor to cause the computing device to:
upon receiving an electronic message representing a meeting request for requesting a meeting with a service provider, the meeting request containing data representing a requested service of the service provider and a plurality of parameters provided by a meeting requester,
determine whether to accept the requested meeting utilizing a decision tree pre-configured at the computing device by the service provider, the decision tree containing one or more hierarchical decision nodes individually comparing one or more of the parameters concerning the requested service to a corresponding criterion automatically provisioned by a calendar server based on a knowledge database or machine learning; and
in response to determining to not accept the requested meeting, invoke, with the processor, an application identified in one of the hierarchical decision nodes of the decision tree based on the parameters in lieu of scheduling a meeting in response to the received electronic message representing the meeting request and providing results of the invoked application to the meeting requester via the computer network in lieu of accepting the requested meeting.

11. The computing device of claim 10 wherein the memory contains additional instructions executable by the processor to cause the computing device to:
in response to determining to accept the meeting,
transmit, via the computer network, to the meeting requester a meeting confirmation to accept the requested meeting; and
automatically generate a meeting appointment, on the server, as a calendar item of the service provider.

12. The computing device of claim 10 wherein to determine whether to accept the requested meeting includes:
to determine whether invocation of an application can replace having the requested meeting; and
in response to determining that invocation of an application can replace having the requested meeting, to invoke the application in lieu of accepting the requested meeting.

13. The computing device of claim 10 wherein to determine whether to accept the requested meeting includes:
to determine whether invocation of a web-based application can replace having the requested meeting; and
in response to determining that invocation of an application can replace having the requested meeting, to implement a function call through an application programming interface related to the web-based application.

14. The computing device of claim 10 wherein to determine whether to accept the requested meeting includes:
to determine whether invocation of a web-based application can replace having the requested meeting; and
in response to determining that invocation of an application can replace having the requested meeting, to trigger a function call through an application programming interface related to the web-based application and to provide results of the triggered function call to the meeting requester via the computer network in lieu of the meeting confirmation.

15. The computing device of claim 10 wherein to determine whether to accept the requested meeting includes:
to determine whether invocation of a web-based application can replace having the requested meeting; and
in response to determining that invocation of an application can replace having the requested meeting, to trigger a function call through an application programming interface related to the web-based application to generate a document based on the parameters from the meeting requester and to provide the generated document to the meeting requester via the computer network in lieu of accepting the requested meeting.

16. A method for intelligent management of calendar items in a computing system having a server interconnected to client devices by a computer network, the method comprising:

receiving, at the server, an electronic message representing a meeting request for requesting a meeting with a service provider from a webpage of the service provider, the meeting request being generated by the webpage of the service provider based on a plurality of parameters provided by a meeting requester via the webpage and containing data representing a requested service of the service provider and the plurality of parameters provided by the meeting requester via the webpage; and in response to receiving the meeting request, at the server, determining whether to accept the requested meeting corresponding to the meeting request generated by the webpage utilizing a decision tree pre-configured at the computing device by the service provider, the decision tree containing one or more hierarchical decision nodes individually comparing one or more of the parameters concerning the requested service and provided by the meeting requester via the webpage to a corresponding criterion included in a data structure of the one or more hierarchical decision nodes; and in response to determining to not accept the requested meeting, invoking an application identified in one of the hierarchical decision nodes of the decision tree based on the parameters in lieu of scheduling a meeting in response to the received electronic message representing the meeting request and providing results of the invoked application to the meeting requester via the computer network in lieu of accepting the requested meeting, thereby improving operations of the server by reducing a number of scheduled meetings for the service provider.

17. The method of claim 16, further comprising:
in response to determining to accept the meeting, transmitting, via the computer network, to the meeting requester a meeting confirmation to accept the requested meeting; and
automatically generating a meeting appointment, on the server, as a calendar item of the service provider.

18. The method of claim 16 wherein determining whether to accept the requested meeting includes:
determining whether invocation of an application can replace having the requested meeting; and
in response to determining that invocation of an application can replace having the requested meeting, invoking the application in lieu of accepting the requested meeting.

19. The method of claim 16 wherein determining whether to accept the requested meeting includes:
determining whether invocation of a web-based application can replace having the requested meeting; and
in response to determining that invocation of an application can replace having the requested meeting, implementing a function call through an application programming interface related to the web-based application.

20. The method of claim 16 wherein determining whether to accept the requested meeting includes:
determining whether invocation of a web-based application can replace having the requested meeting; and
in response to determining that invocation of an application can replace having the requested meeting, triggering a function call through an application programming interface related to the web-based application and to provide results of the triggered function call to the meeting requester via the computer network in lieu of the meeting confirmation.

* * * * *